US011578150B2

(12) United States Patent
Abbott, Jr. et al.

(10) Patent No.: US 11,578,150 B2
(45) Date of Patent: Feb. 14, 2023

(54) REFRACTIVE INDEX MATCHED RESIN FOR ELECTROPHORETIC DISPLAYS AND OTHER APPLICATIONS

(71) Applicants: James E. Abbott, Jr., Albany, OR (US); Timothy Koch, Albany, OR (US); Cassady Roop, Corvallis, OR (US); Palitha Wickramanayake, Corvallis, OR (US)

(72) Inventors: James E. Abbott, Jr., Albany, OR (US); Timothy Koch, Albany, OR (US); Cassady Roop, Corvallis, OR (US); Palitha Wickramanayake, Corvallis, OR (US)

( * ) Notice: Subject to any disclaimer, the term of this patent is extended or adjusted under 35 U.S.C. 154(b) by 0 days.

(21) Appl. No.: 17/498,702

(22) Filed: Oct. 11, 2021

(65) Prior Publication Data
US 2022/0177617 A1 Jun. 9, 2022

Related U.S. Application Data

(63) Continuation of application No. 16/259,078, filed on Jan. 28, 2019, now Pat. No. 11,174,328.

(60) Provisional application No. 62/631,623, filed on Feb. 16, 2018.

(51) Int. Cl.
C08F 14/18 (2006.01)
C08F 2/46 (2006.01)
C08K 5/11 (2006.01)
C08K 5/29 (2006.01)
C08K 9/06 (2006.01)
G02F 1/167 (2019.01)
G02B 1/04 (2006.01)
G02F 1/16756 (2019.01)
G09G 3/34 (2006.01)

(52) U.S. Cl.
CPC .............. *C08F 14/185* (2013.01); *C08F 2/46* (2013.01); *C08K 5/11* (2013.01); *C08K 5/29* (2013.01); *C08K 9/06* (2013.01); *G02B 1/04* (2013.01); *G02F 1/167* (2013.01); *G02F 1/16756* (2019.01); *C08K 2201/002* (2013.01); *G02F 2202/023* (2013.01); *G02F 2202/09* (2013.01); *G02F 2202/16* (2013.01); *G02F 2202/36* (2013.01); *G09G 3/344* (2013.01)

(58) Field of Classification Search
CPC . C08F 2/46; C08F 14/185; C08K 5/11; C08K 5/29; C08K 9/06; C08K 2201/002; G02B 1/04; G02B 1/167; G02B 1/16756; G02F 2202/203; G02F 2202/09; G02F 2202/16; G02F 2202/36; G09G 3/344
USPC ....................................... 522/90, 96, 181, 97
See application file for complete search history.

(56) References Cited

U.S. PATENT DOCUMENTS

| 7,575,847 | B2 * | 8/2009 | Jing | G03F 7/0388 |
| | | | | 430/311 |
| 2007/0287093 | A1 * | 12/2007 | Jing | G03F 7/091 |
| | | | | 430/270.1 |
| 2008/0020007 | A1 * | 1/2008 | Zang | A61K 8/0295 |
| | | | | 349/92 |

FOREIGN PATENT DOCUMENTS

WO WO-2017136374 A1 * 8/2017 ........... A61K 6/0005

* cited by examiner

*Primary Examiner* — Sanza L. McClendon
(74) *Attorney, Agent, or Firm* — Olivo IP Law Group, P.C.; John W. Olivo, Jr.

(57) ABSTRACT

Embossing resins, methods of manufacturing such resins, and electrokinetic display system, which includes display cells containing such resins. The resins include a fluoropolymer in weight percentage 5%-60%, a difunctional diluent in weight percentage 0-30%, a monofunctional diluent in weight percentage 0-40%, a urethane diacrylate or functionalized nanoscale material, e.g., a functionalized urethane material, in weight percentage 5-50%, a photoinitiator in weight percentage 0.5-5%, and a surfactant in weight percentage less than 0.5%. The difunctional diluent may be Hexanediol Diacrylate, and the monofunctional diluent may be a monofunctional hydrocarbon. The resins are made by identifying a target index of refraction for a cured state thereof, and combining together, by weight percentage, the constituent components to produce the liquid state version of the embossing resin having a desired composite index of refraction.

20 Claims, 1 Drawing Sheet

REFRACTIVE INDEX MATCHED RESIN FOR ELECTROPHORETIC DISPLAYS AND OTHER APPLICATIONS

PRIORITY CLAIMS

This application is a continuation of and claims priority to U.S. application Ser. No. 16/259,078, filed Jan. 28, 2019, which claims the benefit of U.S. Provisional Application Ser. No. 62/631,623, filed Feb. 16, 2018, the contents of which are incorporated herein.

FIELD OF THE INVENTION

The present invention relates to cured resin embossed structures for use in electrophoretic displays and other assemblies, wherein said cured resin embossed structures have indices of refraction matched to those of electronic inks or other fluid mediums used in said assemblies.

BACKGROUND OF THE INVENTION

Within the field of electronic displays and the like are a group of electrokinetic display systems that can change state, e.g., from transparent (or clear) to opaque (or dark) or somewhere in-between by application of an electric potential to translate charged colorant particles (pigments) suspended in a carrier fluid to and from reservoir regions within cells of the display. Among the important characteristics of such electrokinetic display systems are transparency (when in a clear state) and switching speed.

SUMMARY OF THE INVENTION

An embossing resin in accordance with various embodiments of the invention includes a fluoropolymer in weight percentage 5%-60%, a difunctional diluent in weight percentage 0%-30%, a monofunctional diluent in weight percentage 0%-40%, a urethane diacrylate or functionalized nanoscale material, e.g., a functionalized urethane material, which, in some embodiments, comprises fluorinated or siliconized urethane material, in weight percentage 5%-50%, a photoinitiator in weight percentage 0.5%-5%, and a surfactant in weight percentage less than 0.5%. The difunctional diluent may be Hexanediol Diacrylate, and the monofunctional diluent may be a monofunctional hydrocarbon.

In further embodiments, the present invention provides a method of manufacturing an embossing resin, which method includes identifying a target index of refraction, $n_{target}$, for a cured state of the embossing resin, and combining together, by weight percentage, wt $\%_i$, constituent components of the embossing resin in liquid state to produce a liquid state version of said embossing resin. Each of the constituent components of the embossing resin has a respective index of refraction, $n_i$, and the constituent components are combined with one another to produce the liquid state version of the embossing resin having a composite index of refraction, $n_T$, according to:

$$n_T = \Sigma_i wt\,\%_i n_i = n_{target} - \beta,$$

where $\beta$ is a correction factor in the range 0.035-0.05. In one embodiment, $\beta$ is 0.04.

In some instances, the constituent components of the embossing resin may include a fluoropolymer in weight percentage 5%-60%, a difunctional diluent in weight percentage 0%-30%, a monofunctional diluent in weight percentage 0%-40%, a urethane diacrylate or functionalized nanoscale material, e.g., a functionalized urethane material, which, in some embodiments, comprises fluorinated or siliconized urethane material, in weight percentage 5%-50%, a photoinitiator in weight percentage 0.5-5%, and a surfactant in weight percentage less than 0.5%. The difunctional diluent may be Hexanediol Diacrylate, and the monofunctional diluent may be a monofunctional hydrocarbon.

Still additional embodiments of the invention provide an electrokinetic display system, which includes a display cell defined by opposing substrate sections, one of which substrate sections has a first electrode disposed thereon, and the other of which substrate sections has a second electrode disposed thereon; an embossed dielectric layer with a plurality of recess regions disposed on one of the first or second electrodes; and an electrokinetic ink disposed within the display cell. A material that makes up the embossed dielectric layer has an index. of refraction approximately equal to an index of refraction of a fluid or suspension that fills the display cell. In various instances, the substrates may be a transparent polymer or glass. the electrodes may be films of transparent conductive material (e.g., carbon nanotubes. a conducting oxide, Indium Tin Oxide, a conducting polymer, or poly 3,4-ethylenedioxythiophene, etc.), and the embossed dielectric layer may include a cured resin including a fluoropolymer in weight percentage 5%-60%, a difunctional diluent in weight percentage 0-30%, a monofunctional diluent in weight percentage 0-40%, a urethane diacrylate or functionalized nanoscale material, e.g., a functionalized urethane material, which, in some embodiments, comprises fluorinated or siliconized urethane material, in weight percentage 5%-50%, a photoinitiator in weight percentage 0.5%-5%, and a surfactant in weight percentage less than 0.5%. The difunctional diluent may include Hexanediol Diacrylate, and the monofunctional diluent may include a monofunctional hydrocarbon.

These and further embodiments of the invention are described more fully below.

BRIEF DESCRIPTION OF THE DRAWINGS

The present invention is illustrated by way of example, and not limitation, in the figures of the accompanying drawings, in which.

DETAILED DESCRIPTION OF THE PREFERRED EMBODIMENT

Figure 1A:
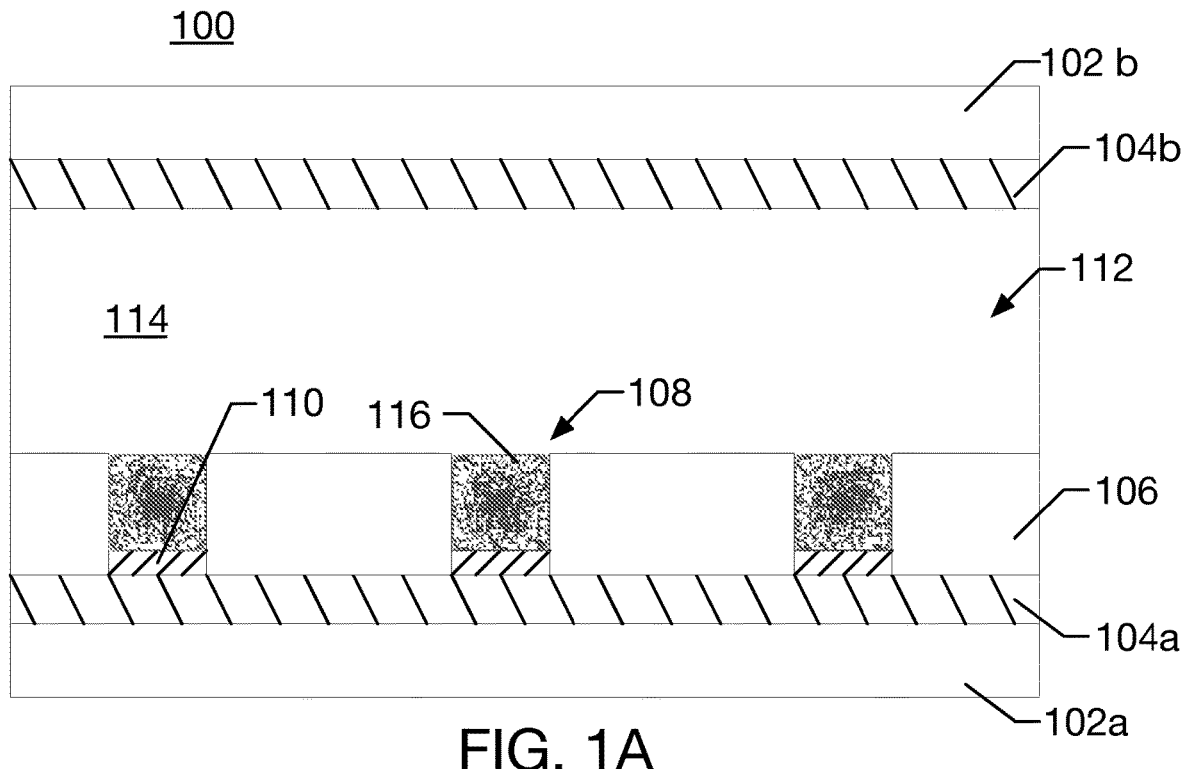
FIG. 1A is adapted from U.S. Pat. No. 8,183,757 and shows a cross-sectional view of portions of an electronic display that can change state, e.g., from transparent (or clear) to opaque (or dark), through the application of an electric potential to translate charged colorant particles (pigments) suspended in a carrier fluid.

As noted above, there exists a group of electrokinetic display systems that can change state, e.g., from transparent (or clear) to opaque (or dark) or somewhere in-between by application of an electric potential to translate charged colorant particles (pigments) suspended in a carrier fluid to and from reservoir regions within cells of the display. The pigmented carrier fluids are commonly referred to as electronic inks and are typically composed of either polar or non-polar fluids with added surfactants, charging agents, stabilizers, and dispersants, along with the charged particles that move according to applied electric fields. FIG. 1A, adapted from U.S. Pat. No. 8,183,757, shows a cross-sectional view of such a display 100 that includes substrates 102a, 102b (e.g., polyethylene terephthalate (PET), glass, or other suitable transparent material), electrodes 104a, 104b, formed from a film of transparent conductive material (e.g., carbon nanotubes, a conducting oxide such as Indium Tin Oxide (ITO), or a conducting polymer such as PEDOT (poly 3,4-Ethylenedioxythiophene)), an embossed dielectric layer 106 with reservoir or recess regions 108, metal opaque layers 110 formed within each recess region, and a display cell 112 filled with a carrier fluid 114 with colorant particles 116.

Figure 1B:
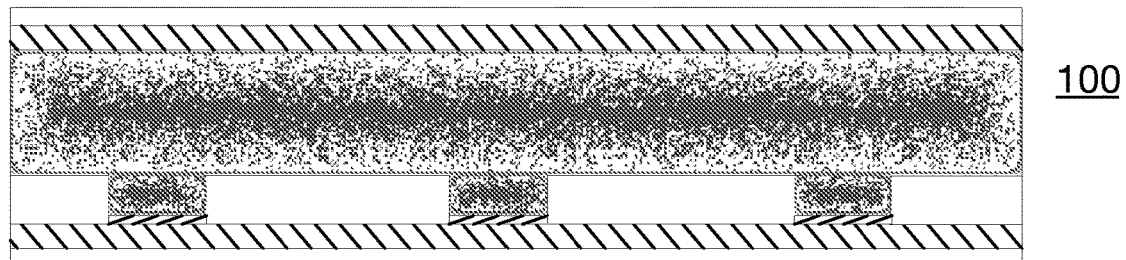
FIG. 1B shows the display illustrated in FIG. 1A in a partially transparent state.
Figure 1C:
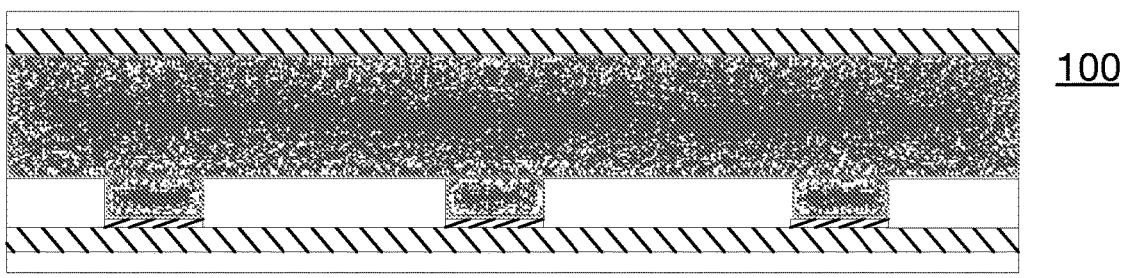
FIG. 1C shows the display illustrated in FIG. 1A in a dark or tinted state.

In FIG. 1A, display 100 is shown in its "clear" state, with the positively charged colorant particles 116 collected within reservoirs 108 by virtue of a negative electric charge applied to electrode 104a. FIG. 1B shows display 100 in a partially transparent state, and FIG. 1C shows display 100 in a dark or tinted state. The latter two states are achieved by varying the electric potential applied to electrodes 104a, 104b.

As explained in U.S. Pat. No. 8,183,757, display 100 may be fabricated by forming dielectric layer 106 from a curable resin on electrode 104a, which is disposed on substrate 102a, embossing it to create recess regions 108, and then curing the resin using ultraviolet (UV) light. Thereafter, the metal electrodes 110 may be formed, for example, by electroplating them within the recesses 108. Electrode 104b is formed on a second substrate 102b, and the two units are joined together at their edges (e.g., by an adhesive), creating display cell 112 between them. The display cell may then be filled with the carrier fluid and the charged colorant particles.

Among the important characteristics of electrokinetic display systems such as display 100 are transparency (when in a clear state) and switching speed. Transparency, especially in terms of a reduction of haze, is important because consumers will not accept electrokinetic display systems as replacements for conventional glass in automotive, architectural, or other applications if such displays obscure their views. The present invention addresses both of these considerations and provides a display with improved optical performance (reduction of haze) and reduced switching times.

In the present context, haze refers to scattering of light as it transits through display 100. The inventors have measured haze associated with displays that employ a dielectric layer 106 made of conventional resins at approximately 13.5%, In contrast, haze associated with the use of refractive index matched resins for dielectric layer 106 manufactured in accordance with the present invention have been measured at approximately 5.9%, and even as low as approximately 3.4%. Light transmission through a display, such as display 100 that includes pigments, has similarly been observed to improve by approximately 15% through use of refractive index matched resins for dielectric layer 106 over that for displays which use conventional resins for dielectric layer 106.

Switching speed, e.g., from clear to dark states or vice-versa, is important because consumers favor and have been conditioned to expect rapid responses to input commands. Visual observations of switching speeds for displays that include refractive index matched resins for dielectric layer 106 confirm faster switching speeds than those associated with displays, which use conventional resins for dielectric layer 106. Further, while previous electrokinetic displays which used conventional resins for dielectric layer 106 required switching voltages on the order of 36 V or more, displays that include refractive index matched resins for dielectric layer 106 in accordance with the present invention achieve the improved switching speeds at reduced switching voltages of 24 V or less.

The present invention then provides resins, for embossed microfluidic arrays that make up dielectric layers 106 of electrokinetic displays such as those illustrated in FIGS. 1A-1C and other applications, that have a refractive index matched (or approximately matched) to that of the electrokinetic ink or other fluid included in the display cells. More generally, the present resins have a refractive index matched (or approximately matched) to that of a fluid or a suspension that allows for electrical control of a display's transparency. Matching the indices of refraction reduces haze and improves light transmission through such a display.

The present embossing resin used for microfluidic structures such as dielectric layer 106 retains excellent mechanical properties for use in electrokinetic display systems and other applications. In one embodiment, the refractive index of the embossing resin used for dielectric layer 106, when cured, is approximately 1.44, which better matches the refractive index of the electrokinetic ink or other fluid or suspension that fills display cell 112 than previous resins used for such applications. Importantly, the present resin, when cured remains mechanically stable and flexible, while having low chemical reactivity. The resin is non-polar (i.e., hydrophobic) and resistant to oil absorption. This is important inasmuch as many electrokinetic inks used in electrokinetic display systems are oil based.

In general, the present resin used for dielectric layer 106 is a fluoropolymer-based composition with the following components:

| Material | Purpose | Weight Percentage |
| --- | --- | --- |
| Fluoropolymer | Lower refractive index, creates low surface energy embossing | 5-60% |
| Hexanediol Diacrylate (or other difunctional diluent) | High speed curing diluent | 0-30% |
| Monofunctional Hydrocarbon (or other monofunctional diluent) | Curing diluent | 0-40% |
| Urethane Diacrylate or functionalized nanoscale material, e.g., a functionalized urethane material, which, in some embodiments, comprises fluorinated or siliconized urethane material | Rapid curing urethane for improved mechanical stability | 5-50% |
| Photoinitiator | Provides UV sensitivity for curing | 0.5-5% |
| Surfactant | Wetting agent | <0.5% |

Unlike previous resins used for microfluidic structures such as dielectric layer 106, typically in the present resin no adhesion promoter is present Instead" an adhesion promoter may be applied separately to electrode 104a before the resin that makes up dielectric layer 106 is applied. The absence of the adhesion promoter may allow a boundary layer at the surface of the resin to be less viscoelastic than was the case for previous resins used in such applications. In addition, the weight percentage of urethane diacrylate in the present resin formulation is less than that used in previous resins. The reduction in weight percentage of urethane diacrylate allows for use of a significant weight percentage fraction of a fluoropolymer in the present resin.

Displays configured in accordance with the present invention include substrates 102a, 102b (e.g., a transparent polymer such as polyethylene terephthalate (PET), glass, or other suitable transparent material), electrodes 104a, 104b, formed from a film of transparent conductive material (e.g., carbon nanotubes, a conducting oxide such as Indium Tin Oxide (ITO) or a conducting polymer such as PEDOT (poly 3,4-Ethylenedioxythiophene)), an embossed dielectric layer 106 composed of the present index-matched resin with reservoir or recess regions 108, optional metal opaque layers 110 formed within each recess region, and a display cell 112 filled with a carrier fluid 114 with colorant particles 116 (which carrier fluid and colorants comprise the electrokinetic ink) or other fluid or suspension. Electrokinetic inks selected for such applications should exhibit good optical characteristics (e.g., should be highly transparent when the display is in a clear state), allow fast switching speeds (i.e., state changes—clear to dark or dark to clear—for a given applied electric potential), and be stable so as to persist over high numbers of switching cycles. Generally, electrokinetic inks or other fluid or suspension that fill the display cell will be first selected for respective particular applications and a resin formulation for the dielectric layer 106 will then be prepared so as to match the refractive index of the selected electrokinetic ink, other fluid or suspension. In arriving at this match, it must be remembered that the resin will be cured to form the dielectric layer 106, and that the cured resin will have a refractive index different than that when in its liquid state.

The present inventors have devised a model for predicting the refractive index of the pre-cured resin. In general, the refractive indices of components of the resin can be considered to add to each other linearly based on their weight percent (wt %) in the final composition. This holds well for the liquid state as the densities of the constituent liquids are similar. For example, the refractive index of a specific resin constituent can be designated as $n_i$. The contribution of this constituent to the composite refractive index is then given by wt $\%_i n_i$. The composite refractive index, $n_T$, for the liquid state resin is then given by:

$$n_T = \sum_i \text{wt } \%_i n_i$$

The following table provides an example of the refractive index tuning for materials of interest in one embodiment of a resin configured in accordance with the present invention.

| Material | Index of refraction | wt % (%) | Weighted index (by computation) | Actual Pre-Cure Index |
|---|---|---|---|---|
| Fluoropolymer | 1.3369 | 35 | 0.467915 | |
| Di-functional Diluent | 1.456 | 22.95 | 0.334152 | |
| Monofunctional Diluent | 1.4453 | 30 | 0.43359 | |
| Urethane Diacrylate or functionalized nanoscale material, e.g., a functionalized urethane material, which, in some embodiments, comprises fluorinated or siliconized urethane material | 1.4882 | 10 | 0.14882 | |
| Photoinitiator | 1.56 | 2 | 0.0312 | |
| Surfactant | 1.33 | 0.05 | 0.000665 | |
| | | 100 | 1.416342 | 1.4254 |

From this table one can see that the modeled value for refractive index is −0.01 below the measured value of the liquid resin. Additionally, the inventors have found empirically that after curing the refractive index of the resin typically increases by approximately 0.03 relative to the measured value for the liquid. Overall, then there is a model error of −0.04 (e.g., 0.035–0.05) between the predicted value based on constituent components and the final cured resin. This error is consistent and can therefore be accounted for in the design process.

This methodology thus allows one to design a wide array of materials with the chemical, mechanical, and optical properties critical for desired applications. For example, an embossing resin may be manufactured by identifying a target index of refraction, $n_{target}$, for a cured state of the embossing resin, and then combining together, by weight percentage, wt $\%_i$, constituent components of the embossing resin in liquid state to produce a liquid state version of the embossing resin. As discussed above, each of the constituent components has a respective index of refraction, $n_i$, and the constituent components are combined with one another to produce the liquid state version of the embossing resin having a composite index of refraction, $n_T$, according to:

$$n_T = \Sigma_i \text{wt } \%_i n_i = n_{target} - \beta,$$

where β is a correction factor in the range 0.035-0.05, and in some instances 0.04.

Displays configured in accordance with the present invention may be manufactured using roll-to-roll processing techniques known in the art. These techniques involve the use of self-aligned imprint lithography as part of a deposition-imprint-etch procedure. Briefly, the process commences with a deposition step in which an electrode layer is deposited on a substrate and a dielectric layer is then formed on the electrode layer. The dielectric layer is composed of the present resin and once formed on the electrode layer it is patterned and cured so as to imprint recesses 108 into the dielectric layer. Optionally thereafter, metal electrodes may be deposited or electroplated within the recesses in the substrate-electrode-dielectric panel. In some cases, no such metal electrodes are used. A complementary panel may be similarly formed by depositing an electrode layer on a substrate. No dielectric layer is needed for this complementary panel. The two panels may then be joined together at their respective edges using appropriate adhesives, thus forming the display cells for the electrokinetic ink or other fluid or suspension.

The present invention thus provides a low refractive index, fluorinated embossing resin that improves the performance of displays that utilize electrokinetic inks or other fluids or suspensions. Unlike resins of the past, the present resin has a significant level of fluorination. It also retains a sufficient urethane component to provide mechanical stability.

Embodiments of the invention provide an embossing resin that includes a fluoropolymer in weight percentage 5%-60%, a difunctional diluent in weight percentage 0-30%, a monofunctional diluent in weight percentage 0-40%, a urethane diacrylate or functionalized nanoscale material, e.g., a functionalized urethane material, which, in some embodiments, comprises fluorinated or siliconized urethane material, in weight percentage 5-50%, a photoinitiator in weight percentage 0.5-5%, and a surfactant in weight percentage less than 0.5%. The difunctional diluent may be Hexanediol Diacrylate, and the monofunctional diluent may be a monofunctional hydrocarbon.

Further embodiments of the invention provide a method of manufacturing an embossing resin, which method includes identifying a target index of refraction, $n_{target}$, for a cured state of the embossing resin, and combining together, by weight percentage, wt %$_i$, constituent components of the embossing resin in liquid state to produce a liquid state version of said embossing resin. Each of the constituent components of the embossing resin has a respective index of refraction, $n_i$, and the constituent components are combined with one another to produce the liquid state version of the embossing resin having a composite index of refraction, $n_T$, according to:

$$n_T = \Sigma_i \text{wt \%}_i n_i = n_{target} - \beta,$$

where $\beta$ is a correction factor in the range 0.035-0.05. In one embodiment, $\beta$ is 0.04. In some instances, the constituent components of the embossing resin may include a fluoropolymer in weight percentage 5%-60%, a difunctional diluent in weight percentage 0-30%, a monofunctional diluent in weight percentage 0-40%, a urethane diacrylate or functionalized nanoscale material, e.g., a functionalized urethane material, which, in some embodiments, comprises fluorinated or siliconized urethane material, in weight percentage 5-50%, a photoinitiator in weight percentage 0.5-5%, and a surfactant in weight percentage less than 0.5%. The difunctional diluent may be Hexanediol Diacrylate, and the monofunctional diluent may be a monofunctional hydrocarbon.

Still additional embodiments of the invention provide an electrokinetic display system, similar to that illustrated in FIGS. 1A-1C, which includes a display cell defined by opposing substrate sections, one of which substrate sections has a first electrode disposed thereon, and the other of which substrate sections has a second electrode disposed thereon; an embossed dielectric layer with a plurality of recess regions disposed on one of the first or second electrodes: and an electrokinetic ink disposed within the display cell. A material that makes up the embossed dielectric layer has an index of refraction approximately equal to an index of refraction of a fluid or suspension that fills the display cell. In various instances, the substrates may be a transparent polymer or glass, the electrodes may be films of transparent conductive material (e.g., carbon nanotubes, a conducting oxide, Indium Tin Oxide, a conducting polymer, or poly 3,4-Ethylenedioxythiophene, etc.), and the embossed dielectric layer may include a cured resin including a fluoropolymer in weight percentage 5%-60%, a difunctional diluent in weight percentage 0-30%, a monofunctional diluent in weight percentage 0-40%, a urethane diacrylate or functionalized nanoscale material, e.g., a functionalized urethane material, which, in some embodiments, comprises fluorinated or siliconized urethane material, in weight percentage 5-50%, a photoinitiator in weight percentage 0.5-5%, and a surfactant in weight percentage less than 0.5%. The difunctional diluent may include Hexanediol Diacrylate, and the monofunctional diluent may include a monofunctional hydrocarbon.

What is claimed is:

1. An electrokinetic display system having an embossed dielectric layer that includes a fluoropolymer, a difunctional diluent, a monofunctional diluent, a urethane diacrylate or functionalized nanoscale material, a photo initiator, and a wetting agent surfactant and further comprises a display cell defined by opposing substrate sections, one of which substrate sections has a first electrode disposed thereon, and the other of which substrate sections has a second electrode disposed thereon; the embossed dielectric layer having a plurality of recess regions disposed on one of the first or second electrodes; and a fluid or suspension that fills the display cell, wherein the embossed dielectric layer has an index of refraction approximately equal to an index of refraction of the fluid or suspension that fills the display cell.

2. The electrokinetic display system of claim 1, wherein the substrate sections comprise a transparent polymer or glass.

3. The electrokinetic display system of claim 1, wherein the first and second electrodes comprise films of transparent conductive material.

4. The electrokinetic display system of claim 1, wherein the first and second electrodes comprise one of: carbon nanotubes, a conducting oxide; Indium Tin Oxide, a conducting polymer, or poly 3,4-ethylenedioxythiophene.

5. The electrokinetic display system of claim 1, wherein the difunctional diluent comprises Hexanediol Diacrylate.

6. The electrokinetic display system of claim 1, wherein the monofunctional diluent comprises a monofunctional hydrocarbon.

7. The electrokinetic display system of claim 1, wherein the functionalized nanoscale material comprises a functionalized urethane material.

8. The electrokinetic display system of claim 1, wherein the fluid or suspension comprises electrokinetic ink.

9. An electrokinetic display system having an embossed dielectric layer that includes a fluoropolymer a difunctional diluent, a monofunctional diluent, a urethane diacrylate or functionalized nanoscale material, a photo initiator, and a wetting agent surfactant and further comprises a display cell defined by opposing substrate sections, one of which substrate sections has a first electrode disposed thereon, and the other of which substrate sections has a second electrode disposed thereon; the embossed dielectric layer having a plurality of recess regions disposed on one of the first or second electrodes; and an electrokinetic ink disposed within the display cell, wherein the embossed dielectric layer has an index of refraction approximately equal to an index of refraction of the electrokinetic ink disposed within the display cell.

10. The electrokinetic display system of claim 9, wherein the substrate sections comprise a transparent polymer or glass.

11. The electrokinetic display system of claim 9, wherein the first and second electrodes comprise films of transparent conductive material.

12. The electrokinetic display system of claim 9, wherein the first and second electrodes comprise one of: carbon nanotubes, a conducting oxide; Indium Tin Oxide, a conducting polymer, or poly 3,4-ethylenedioxythiophene.

13. The electrokinetic display system of claim 9, wherein the difunctional diluent comprises Hexanediol Diacrylate.

14. The electrokinetic display system of claim 9, wherein the monofunctional diluent comprises a monofunctional hydrocarbon.

15. The electrokinetic display system of claim 9, wherein the functionalized nanoscale material comprises a functionalized urethane material.

16. The electrokinetic display system of claim 9, wherein the fluid or suspension comprises electrokinetic ink.

17. An electrokinetic display system having an embossed dielectric layer that includes a fluoropolymer, a difunctional diluent, a monofunctional diluent, a urethane diacrylate or functionalized nanoscale material, a photo initiator, and a wetting agent surfactant and further comprises a display cell defined by opposing substrate sections, one of which substrate sections has a first electrode disposed thereon, and the other of which substrate sections has a second electrode disposed thereon; the embossed dielectric layer having a plurality of recess regions disposed on one of the first or second electrodes; and a fluid or suspension that fills the display cell, wherein the embossed dielectric layer has an index of refraction approximately equal to an index of refraction of the fluid or suspension that fills the display cell, and wherein said electrokinetic display system is integrated into a building management system for controlling an amount of photonic energy transmittable from an exterior of a building to the interior of said building.

18. The display system of claim 17 wherein a computer is used to control multiple electrokinetic displays disposed along an exterior of a building.

19. The display system of claim 18 wherein said computer regulates a degree of said photonic energy.

20. The display system of claim 19 wherein said computer regulates ambient temperatures within said building.

* * * * *